(12) United States Patent
Hwang et al.

(10) Patent No.: US 8,416,360 B2
(45) Date of Patent: Apr. 9, 2013

(54) LIQUID CRYSTAL DISPLAY

(75) Inventors: Jaeho Hwang, Kyungbuk (KR); Youngsung Kim, Seoul (KR); Sukho Son, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 490 days.

(21) Appl. No.: 12/537,337

(22) Filed: Aug. 7, 2009

(65) Prior Publication Data

US 2010/0128193 A1  May 27, 2010

(30) Foreign Application Priority Data

Nov. 27, 2008  (KR) .................. 10-2008-0118952

(51) Int. Cl.
*G02F 1/1333*  (2006.01)

(52) U.S. Cl.
USPC ............ 349/58; 349/61; 349/65; 362/612; 445/24

(58) Field of Classification Search .......... 349/58–63; 362/612, 97.1
See application file for complete search history.

(56) References Cited

U.S. PATENT DOCUMENTS 5,450,221 A * 9/1995 Owen et al. .................. 349/58
6,498,636 B1 * 12/2002 Mathew et al. .............. 349/187

(Continued)

FOREIGN PATENT DOCUMENTS

| CN | 1743919 A | 3/2006 |
| JP | 2007183560 A | 7/2007 |

(Continued)

OTHER PUBLICATIONS

Korean Office Action (Application No. 10-2008-0118952), dated Sep. 21, 2012.

(Continued)

*Primary Examiner* — Edward Glick
*Assistant Examiner* — Sang V Nguyen
(74) *Attorney, Agent, or Firm* — Morgan, Lewis & Bockius LLP (57) ABSTRACT

The invention relate to a liquid crystal display that can improve heat radiation properties as well as may comply with a slim trend of displays. The liquid crystal display including: a liquid crystal panel; a PCB for light source that mounts a plurality of light sources which generate light illuminating the liquid crystal panel, and supplies operation power to the light sources; a bottom cover that includes a receiving unit of which bottom surface is opened and a seating space of which bottom surface is not opened, receives the PCB for light source, and externally exposes a part of a rear surface of the PCB for light source through the receiving unit; a main PCB that supplies a driving signal to the liquid crystal panel and the PCB for light source; and a panel guide that includes a lamination unit receiving the liquid crystal panel and an insertion space receiving the main PCB in a direction perpendicular to the liquid crystal panel, wherein the main PCB is inserted into the insertion space to be positioned within the seating space of the bottom cover.

8 Claims, 6 Drawing Sheets

U.S. PATENT DOCUMENTS

| | | | |
|---|---|---|---|
| 6,917,395 B2 * | 7/2005 | Lee | 349/58 |
| 7,607,790 B2 * | 10/2009 | Chen et al. | 362/97.1 |
| 7,812,898 B2 * | 10/2010 | Tain | 349/61 |
| 7,911,554 B2 * | 3/2011 | Oohira | 349/58 |
| 2002/0084995 A1 | 7/2002 | Chung | |
| 2003/0098940 A1 | 5/2003 | Lee | |
| 2004/0041960 A1 * | 3/2004 | Hwang | 349/58 |
| 2006/0038934 A1 * | 2/2006 | Morishita et al. | 349/58 |
| 2006/0158580 A1 * | 7/2006 | Lai et al. | 349/58 |
| 2007/0046617 A1 * | 3/2007 | Song et al. | 345/102 |
| 2007/0153515 A1 | 7/2007 | Hong et al. | |
| 2008/0084520 A1 * | 4/2008 | Nam et al. | 349/65 |
| 2008/0219003 A1 * | 9/2008 | Park | 362/247 |
| 2009/0002595 A1 * | 1/2009 | Kim | 349/61 |
| 2009/0135332 A1 * | 5/2009 | Hahm et al. | 349/61 |

FOREIGN PATENT DOCUMENTS

| | | |
|---|---|---|
| KR | 20060125325 A | 12/2006 |
| TW | 386173 B | 4/2004 |
| TW | I225229 B | 12/2004 |

OTHER PUBLICATIONS

Taiwanese Office Action (Application No. 098124575), Nov. 30, 2012.

* cited by examiner

LIQUID CRYSTAL DISPLAY

This application claims the benefit of Korea Patent Application No. 10-2008-118952 filed on Number 27, 2008, which is incorporated herein by reference for all purposes as if fully set forth herein.

BACKGROUND OF THE INVENTION

1. Field of the Invention

This document is directed to a liquid crystal display, and more particularly to a liquid crystal display that can improve heat radiation properties as well as may comply with a slim trend of displays.

2. Discussion of the Related Art

Importance of display devices as image information transmitting media has been recently emphasized in the information-oriented society. Cathode ray tubes (CRTs) or brown tubes, which have been mainly employed for display devices, had problems in terms of weight and volume. Various types of flat panel displays are being developed to overcome the shortcoming of the CRTs.

Flat panel displays include liquid crystal displays (LCDs), field emission displays (FEDs), plasma display panels (PDPs), and electro-luminescence (ELs), most of which have been commercially available.

Among these, liquid crystal displays have an increasing applicable range because of light-weight, thin, low-power consumption features. According to this trend, liquid crystal displays have been adopted for portable computers such as laptop computers, office automation apparatuses, audio/video devices, indoor/outdoor advertisement displays, navigators, and rear view detectors. A liquid crystal display displays a desired image by adjusting the amount of transmitting light beams according to an image signal applied to multiple switches for control, which are arranged in a matrix pattern. Liquid crystal displays have been sharply grown up to have a large size and high resolution because of recent achievements of mass production technology and research and development. In addition, liquid crystal displays exhibit a huge amount of demand even in small and middle sized businesses owing to development of mobile display-related industries.

Figure 1:
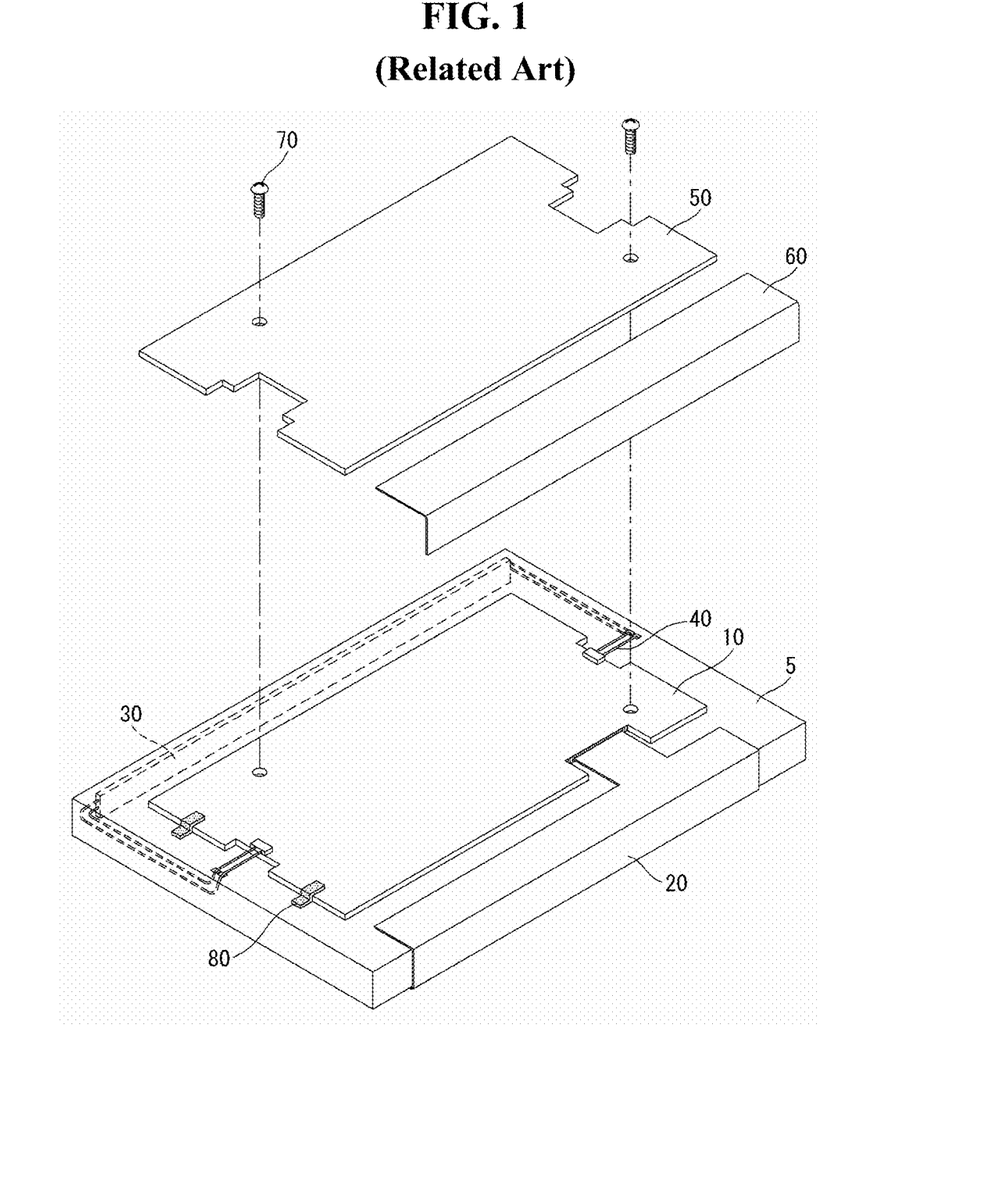
FIG. 1 is a perspective view illustrating a situation of combining components of a related art liquid crystal display, which is seen from the rear surface.

FIG. 1 is a view illustrating a rear side of a liquid crystal display according to the related art.

Referring to FIG. 1, a related art liquid crystal display includes a liquid crystal panel having two glass substrates and a liquid crystal layer arranged between the two glass substrates and having dielectric anisotropy; a backlight unit having light sources and a bottom cover 5 receiving a PCB 30 for light source that generates a light source driving signal to be supplied to the light sources, the backlight unit illuminating the liquid crystal panel; driving integrated circuits (ICs) applying a panel driving signal to signal lines provided to the liquid crystal panel; a main printed circuit board (PCB) 10 for generating a panel driving signal; a flexible printed circuit (FPC) 20 for supplying a panel driving signal from the main PCB 10 to the driving ICs; and a wire 40 for power supply supplying a power signal from the main PCB 10 to the PCB 30 for light source. The main PCB 10 is connected to a side of the FPC 20 and located on the rear surface of the bottom cover 5. A first shield cover 50 and a second shield cover 60 are arranged over the main PCB 10 and the FPC 20, respectively. The first shield cover 50 is fixed onto the main PCB 10 through a screw 70 to protect the main PCB 10 from external temperature or moisture. The second shield cover 60 surrounds the FPC 20 and is fixed onto the rear surface of the bottom cover 5 by an adhesive tape to protect the FPC 20 from external temperature or moisture. The PCB 30 for light source is located at an edge of the liquid crystal display while being surrounded by the bottom cover 5. The main PCB 10 is electrically connected to the bottom cover 5 through a conductive tape 80. The conductive tape 80 guides static electricity from the main PCB 10 to the bottom cover 5 which is grounded to protect circuit elements mounted on the main PCB 10 from the static electricity.

However, these related art liquid crystal displays have the following problems.

Firstly, the PCB for light source emits a great deal of heat because of driving the multiple light sources. The related art liquid crystal display is very weak in heat radiation of the PCB for light source since the PCB for light source is surrounded by the bottom cover and the rear surface of the bottom cover is covered by the main PCB, the first shield cover and the second shield cover which cause the generated heat to be trapped.

Secondly, the related art liquid crystal display has a limitation in reducing its thickness due to the main PCB located on the rear surface of the bottom cover, causing it difficult to allow the display to adapt for the slim trend in thickness.

Finally, the related art liquid crystal display requires many units for assembling a module, thus causing increase in producing costs and complexity of assembling processes. Particularly, the first shield cover, the screw, the second shield cover, the adhesive tape, the conductive tape, and wire for power supply may be primary factors of increasing costs and complicating assembling processes.

SUMMARY OF THE INVENTION

An object of this document is to provide a liquid crystal display that can improve heat radiation properties as well as may comply with a slim trend of displays.

Another object of this document is to provide a liquid crystal display that may reduce the number of units used for assembling a module.

Another object of this document is to provide a liquid crystal display that may prevent abnormal driving of the liquid crystal module to save power consumption.

In an aspect, there is provided a liquid crystal display including: a liquid crystal panel; a PCB for light source that mounts a plurality of light sources which generate light illuminating the liquid crystal panel, and supplies operation power to the light sources; a bottom cover that includes a receiving unit of which bottom surface is opened and a seating space of which bottom surface is not opened, receives the PCB for light source, and externally exposes a part of a rear surface of the PCB for light source through the receiving unit; a main PCB that supplies a driving signal to the liquid crystal panel and the PCB for light source; and a panel guide that includes a lamination unit receiving the liquid crystal panel and an insertion space receiving the main PCB in a direction perpendicular to the liquid crystal panel, wherein the main PCB is inserted into the insertion space to be positioned within the seating space of the bottom cover.

The liquid crystal panel may receive the driving signal through an FPC connected to the liquid crystal panel, wherein the FPC is extended to surround an external surface of the panel guide and then bent to be electrically connected to the main PCB.

The liquid crystal display may further include a top case that surrounds a periphery of the liquid crystal panel and an external surface of the panel guide and the bottom cover, wherein the FPC is shielded by the top case.

A first connector may be formed at a side of the PCB for light source to receive the driving signal, and is coupled with a second connector formed at the main PCB in the seating space.

The liquid crystal display may further include a reflection sheet that includes a base surface and wing surfaces, wherein the base surface includes pores of exposing the plurality of light sources and is attached to the PCB of light source, and the wing surfaces are extended from the base surface and is attached to an internal side wall surface of the panel guide configuring the lamination unit.

The receiving unit of the bottom cover may make a "Z banding" structure by contacting the PCB for light source.

The bottom cover may further include a ground protrusion that is protruded from a side of a bottom surface of the seating space toward the liquid crystal panel so as to contact the main PCB.

The ground protrusion may include a convex part bent toward the main PCB and a straight line part extended in both sides and elastically pressurize the main PCB in the seating space.

The panel guide may further include guiding grooves that guide insertion of the main PCB in the seating space.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Other objectives, features and advantages will be made apparent by the following description and the accompanying drawings.

Hereinafter, exemplary embodiments will be described in detail with reference to FIGS. 2 to 8.

Figure 2:
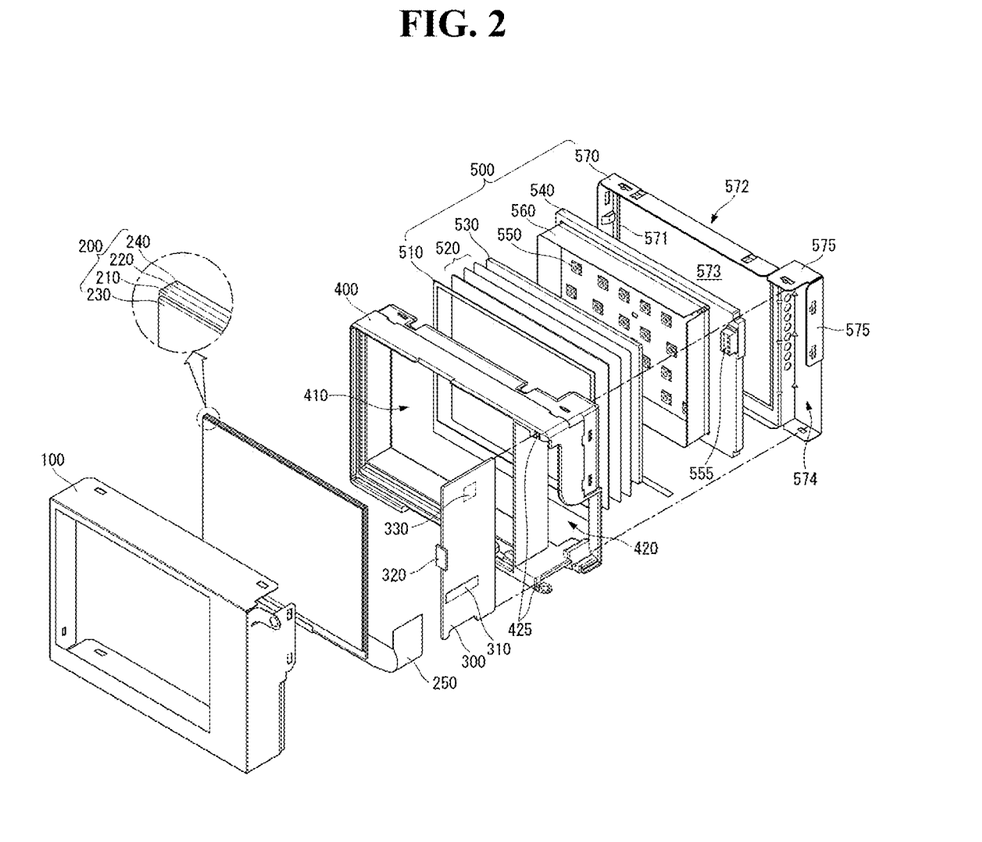
FIG. 2 is an exploded perspective view illustrating a liquid crystal display according to an exemplary embodiment.

Referring to FIG. 2, a liquid crystal display according to an exemplary embodiment includes a top case 100, a board assembly 200, an FPC 250, a main PCB 300, a panel guide 400, and a backlight unit 500.

The top case 100 which is a rectangular mold surrounds the periphery of the board assembly 200, the FPC 250, and four sides of the panel guide 400 and the backlight unit 500.

The board assembly 200 includes a liquid crystal panel and polarizing sheets. The liquid crystal panel includes an upper substrate 210 and a lower substrate 220. A liquid crystal layer is located between the upper substrate 210 and the lower substrate 220 of the liquid crystal panel and a spacer is arranged to maintain a constant distance between the upper substrate 210 and the lower substrate 220.

A color filter, a common electrode, and a black matrix are formed on the upper substrate 210 of the liquid crystal panel. The common electrode may be also formed on the lower substrate 220 depending on the electric field driving method. Signal lines such as a plurality of data lines and gate lines are formed on the lower substrate 220 of the liquid crystal panel and thin film transistors (hereinafter, referred to as TFTs) are located around intersections of the data lines and the gate lines. The TFT is turned on in response to a scan signal (gate pulse) from the gate line to supply a data signal from the data line to a pixel. Each pixel electrode is provided at each pixel between the data line and the gate line.

There is a pad area on a side of the lower substrate 220. At the pad region the data lines and the gate lines are connected. ON the pad area the driving ICs for applying a driving signal to the TFTs are mounted in a chip-on-glass (COG) method. The data driving IC supplies a data signal to the data lines in response to a data control signal from the main PCB 300. The gate driving IC receives a gate control signal from the main PCB 300 via the data driving IC by the driving lines mounted in a line-on-glass method and supplies a scan signal to the gate lines in response to the gate control signal. An upper polarizing sheet 230 is attached on the front surface of the upper substrate 210 and a lower polarizing sheet 240 is attached on the rear surface of the lower substrate 220. And, alignment films are formed on surfaces the upper substrate 210 and the lower substrate 220, abutting the liquid crystal layer, so as to set up a pre-tilt angle of liquid crystal molecules.

Figure 7:
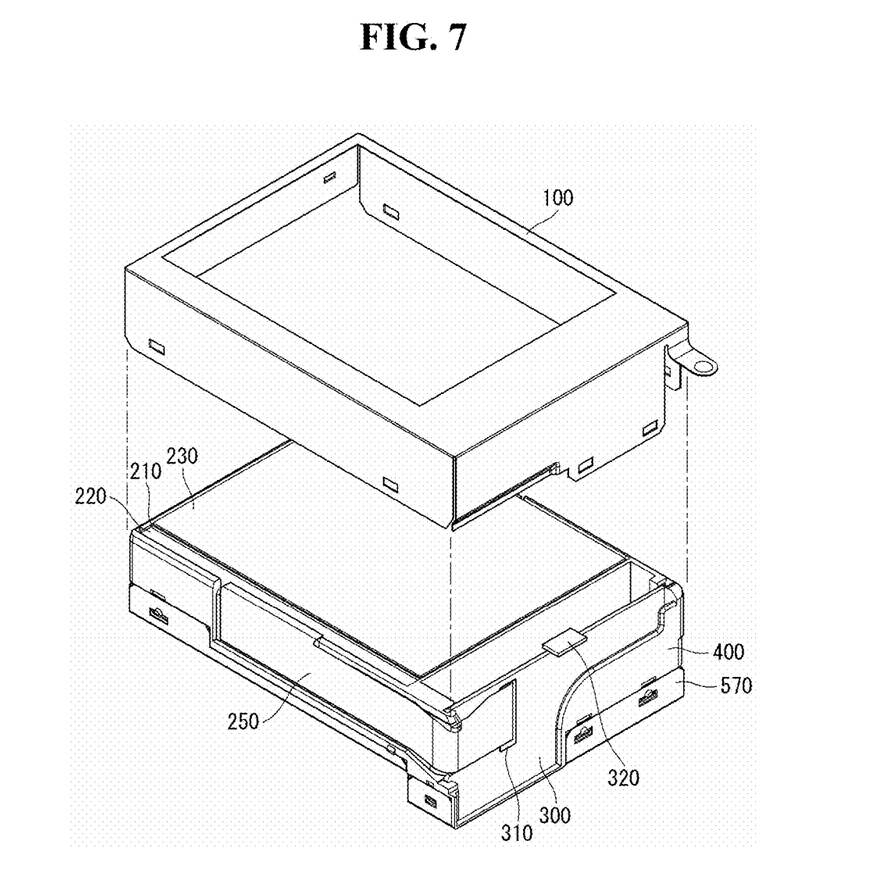
FIG. 7 is a view illustrating shielding an FPC with a top case.

The FPC 250 is electrically connected to pad electrodes of the data driving ICs via an anisotropic conductive film (ACF). And, the FPC 250 is extended to surround an outside of the panel guide 400 and then electrically connected to the main PCB 300. The FPC 250 serves to electrically connect the main PCB 300 to the driving ICs. In particular, since the FPC 250 is shielded from the external environment by the top case 100 surrounding the periphery of the panel guide 400 as shown in FIG. 7, it is unnecessary to have shield covers for protecting FPC and adhesive tapes for fixing the shield cover in contrast to the related art.

There are mounted a power source and a timing controller on the main PCB 300. The power source supplies operation power to the liquid crystal panel and the PCB 540 for light source and the timing controller supplies displaying data to the liquid crystal panel and controls an operation timing of the driving ICs. The main PCB 300 controls the entire driving of the display. The main PCB 300 further includes a first connector 310 that is formed at an external part of the main PCB 300 to be connected to the FPC 250, and a second connector 330 that is formed at an internal part of the main PCB 300 to be connected to the PCB 540 for light source. The main PCB 300 is inserted and fixed into a side space of the panel guide 400 in the direction perpendicular to the liquid crystal panel. AS thus, when the main PCB 300 is inserted into the side space of the panel guide 400 in an upstanding state, it is possible to reduce the thickness of the liquid crystal display by the thickness of the main PCB 300 in comparison with the related art liquid crystal display which fixes the main PCB 300 to the rear surface of the backlight unit 500 in a laid state. Moreover, this exemplary embodiment requires no shield cover to protect the main PCB 300, and thus, may further decrease the thickness of the liquid crystal display as much as the thickness of the shield cover over the related art. A doublesided sticky tape 320 may be further provided between the main PCB 300 and an internal surface of the top case 100 to firmly hold the main PCB 300.

The panel guide 400, which is a mold, includes a rectangular frame, a lamination unit 410 partitioned in the rectangular frame, and an insertion space 420. The lamination unit 410 is formed to have steps at its side walls of the inside thereof and guides the board assembly 200 and parts of the backlight unit 500 so that they are smoothly stacked. The insertion space 420 has a pair of guiding grooves 425 to which the main PCB 300 is inserted. The thickness of the rectangular frame surrounding the insertion space 420 is thicker than the thickness of the rectangular frame surrounding the lamination unit 410.

The backlight unit 500 includes a light shielding member 510, an optical sheet unit 520, a diffusion plate 530, a PCB 540 for light source, light sources 550, a reflection sheet 560, and a bottom cover 570.

Figure 3:
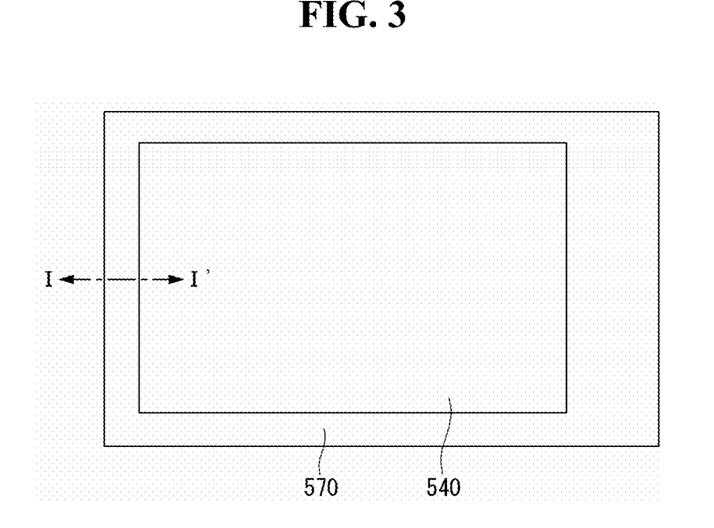
FIG. 3 is a plan view illustrating the rear surface of a liquid crystal display according to an exemplary embodiment.
Figure 4:
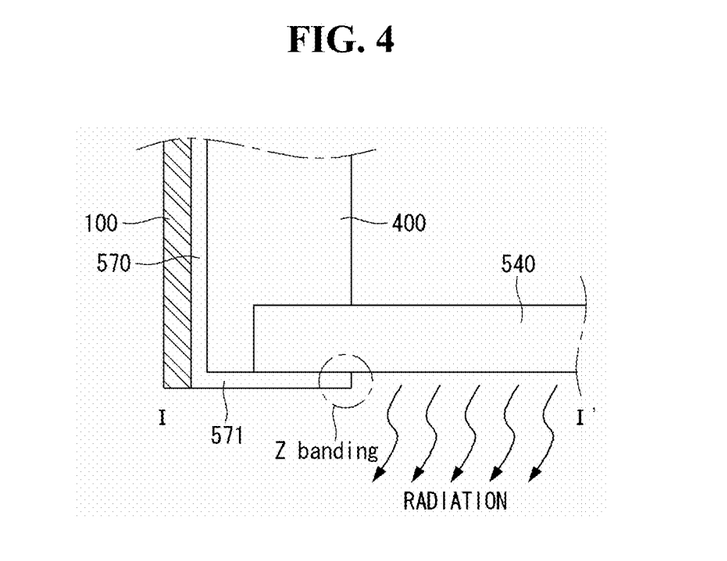
FIG. 4 is a cross sectional view taken along line I-I' of FIG. 3.
Figure 8:
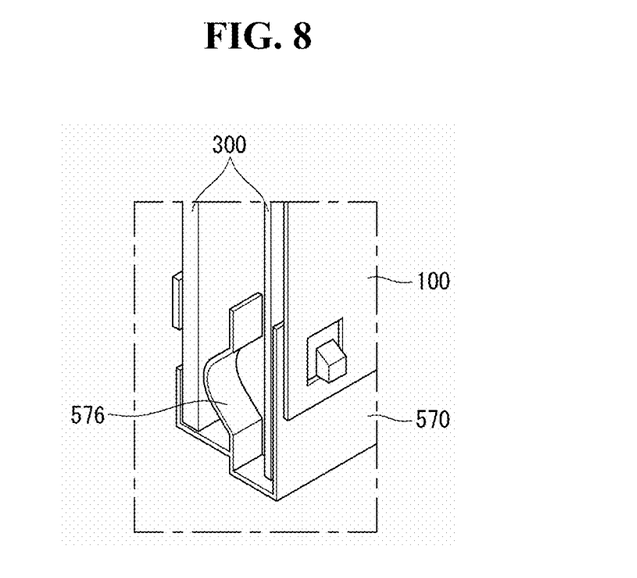
FIG. 8 is a view illustrating a ground protrusion.

The bottom cover 570 includes a receiving unit 572 and a seating space 574. The receiving unit 572 includes wing surfaces 571, each of which has been bent as a rectangular, to accommodate the constructional members 400 and 540 and partially surrounds the rectangular frame of the panel guide 400 surrounding around the lamination unit 410. Especially, the bottom surface 573 of the receiving unit 572 is opened to externally expose the rear surface of the PCB 540 for light source received as shown in FIGS. 3 and 4. Accordingly, heat generated from the PCB 540 for light source may be easily dissipated to the outside, thus making it possible to greatly improve heat radiation properties compared to the related art. The seating space 574 has a space for surrounding the insertion space 420 of the panel guide 400 by using the bottom surface and the wing surfaces 575 bent from the bottom surface. Unlike the receiving unit 572, the bottom surface of the seating space 574 does not open so that the main PCB 300 is not exposed to the external environment. As a consequence, according to the exemplary embodiment, it is possible to remove necessary units such as a shield cover for protecting the main PCB 300 and a screw for fastening the shield cover. Meanwhile, the bottom cover 570 is grounded to function as a path for discharging static electricity. In FIG. 4, a part of the wing surface 571 of the receiving unit 572 contacts the PCB 540 for light source to make a "Z banding" structure along with the PCB 540 for light source, and the banding structure makes the PCB 540 for light source grounded. In addition, a ground protrusion 576 is formed to ground the main PCB 300 at a side of the bottom surface of the seating space 574 as shown in FIG. 8. The ground protrusion 576 includes a convex part bent toward the main PCB 300 and a straight line part extended in both sides to elastically pressurize the main PCB 300 when the main PCB 300 is seated. The ground protrusion 576 may be integrally formed with the bottom cover 570 upon manufacturing the bottom cover 570. As thus, because the main PCB 300 is contacted with the ground protrusion 576, it is possible to remove necessary units such as a ground tape in the related art.

Figure 6:
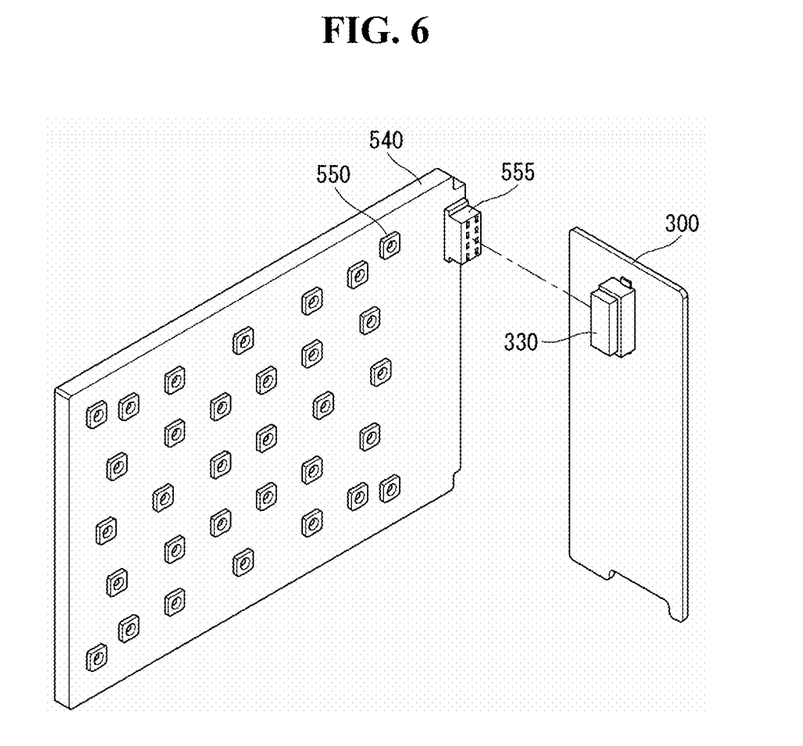
FIG. 6 is a view illustrating a connection between a main PCB and a PCB for light source.

The PCB 540 for light source mounts a plurality of light sources 550 that emit light to be supplied to the board assembly 200. The light sources 550 implemented as a direct-type backlight directly an entire rear surface of the board assembly 200 and each light source may be realized as a white light emitting diode (LED) chip. The PCB 540 for light source includes a contactor 555 for power supply to receive operation power necessary to drive the light source 550 from the main PCB 300. The contactor 555 for power supply is coupled with the second connector 330 of the main PCB 300 in the seating space 574 of the bottom cover 570 to receive operation power necessary to drive the light source 550 from the main PCB 300 as shown in FIG. 6. According to the exemplary embodiment, it is possible to omit the wire for power supply as in the related art. And, it is possible to minimize an amount of signals leaking upon transmission of power for driving the light source by greatly reducing a signal transmission distance compared to the related art that uses the wire.

Figure 5:
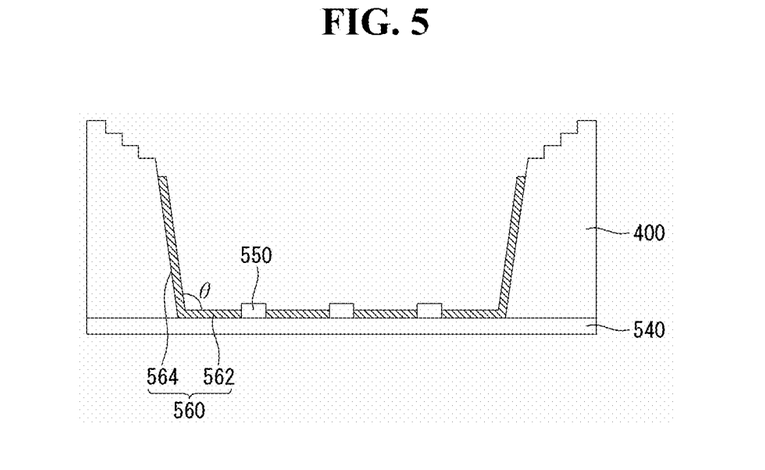
FIG. 5 is a view illustrating a situation of attaching a reflection sheet.

The reflection sheet 560 includes a base surface 562 that has pores exposing the light sources 550 and is attached to the PCB 540 for light source, and wing surfaces 564 that are extended from the base surface 562 and attached to inner side wall surfaces of the panel guide 400 configuring the lamination unit 410 as shown in FIG. 5. The reflection sheet 560 reflects light emitted from the light source 550 toward the board assembly 200 to improve the efficiency of light illuminating the liquid crystal panel. In consideration of light efficiency, here, an angle θ between the base surface 562 and the wing surface 564 may range from 90° to 110°.

The diffusion plate 530 makes uniform the distribution density of the light illuminating the liquid crystal panel by diffusing the light incident from the light sources 550 to be directed toward the liquid crystal panel. The diffusion plate 530 may be formed of polymethylmeth acrylate (PMMA) or glass to prevent deformation caused by heat.

The optical sheet unit 520 makes the traveling direction of the light diffused through the diffusion plate 530 perpendicular to the liquid crystal panel to raise the light efficiency. The optical sheet unit 520 includes at least one or more diffusion sheet, prism sheet, and auxiliary sheet.

The light shielding member 510 is positioned between the verge of the optical sheet unit 520 and the board assembly 200 to prevent the light generated from the light sources 550 from leaking. The light shielding member 510 may be implemented as any types of material which may shield the light with a thin thickness, for example, such as black tapes, black films, and so on.

As described above, the liquid crystal display according to the exemplary embodiments may greatly improve heat radiation properties over the related art by positioning the main PCB in a side space of the display and using a part of the bottom surface of the opened bottom cover to externally expose the rear surface of the PCB for light source to efficiently dissipate heat generated from the PCB for light source.

Moreover, the liquid crystal display according to the exemplary embodiments may lessen the thickness of the liquid crystal display by the thickness of the main PCB in comparison with the related art where the main PCB is fixed to the rear surface of the bottom cover while being laid by arranging the main PCB in the side space of the liquid crystal display. Further, the exemplary embodiments may further reduce the thickness of the liquid crystal display as much as the thickness of the conventional shield cover thanks to no necessity of any shield cover for protecting the main PCB, and thus, comply well with the recent trend of the display being made slimmer and slimmer in thickness.

In addition, the liquid crystal display according to the exemplary embodiments may remove necessary units which are attributed to increase in manufacturing costs and complexity of assembling processes, for example, such as shield covers to protect the main PCB, screws used to connect the shield covers for protection of the main PCB, shield covers for FPC protection, adhesive tapes for fixing the shield covers for FPC protection, conductive tapes for grounding the main PCB, and wires for power supply that supply operation power to the PCB for power source.

Embodiments of the invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A liquid crystal display comprising:
    a liquid crystal panel;
    a PCB (printed circuit board) for light source that mounts a plurality of light sources which generate light illuminating directly on a back surface of the liquid crystal panel, supplies operation power to the light sources, and is disposed in a direction parallel to the liquid crystal panel;
    a bottom cover that includes a receiving unit of which bottom surface is opened and a seating space of which bottom surface is not opened, receives the PCB for light source, and directly exposes a part of a rear surface of the PCB for light source to an external environment through the receiving unit;
    a main PCB that supplies a driving signal to the liquid crystal panel and the PCB for light source;
    a panel guide that includes a lamination unit receiving the liquid crystal panel and an insertion space receiving the main PCB in a direction perpendicular to the liquid crystal panel;
    a first connector formed at a side of the PCB for light source to receive the driving signal; and
    a second connector formed at the main PCB in the seating space for coupling with the first connector,
    wherein the main PCB is inserted into the insertion space to be positioned within the seating space of the bottom cover, such that the main PCB is disposed at one side portion of the liquid crystal panel and the PCB for light source.

2. The liquid crystal display of claim 1, wherein
    the liquid crystal panel receives the driving signal through an FPC (flexible printed circuit) connected to the liquid crystal panel, wherein
    the FPC is extended to surround an external surface of the panel guide and then bent to be electrically connected to the main PCB.

3. The liquid crystal display of claim 2, further comprising:
    a top case that surrounds a periphery of the liquid crystal panel, and an external surface of the panel guide and the bottom cover, wherein
    the FPC is shielded by the top case.

4. The liquid crystal display of claim 1, further comprising:
    a reflection sheet that includes a base surface and wing surfaces, wherein
    the base surface includes pores of exposing the plurality of light sources and is attached to the PCB for light source, and the wing surfaces are extended from the base surface and is attached to an internal side wall surface of the panel guide configuring the lamination unit.

5. The liquid crystal display of claim 1, wherein
    the receiving unit of the bottom cover forms a "Z banding" structure by contacting the PCB for light source.

6. The liquid crystal display of claim 1, wherein
    the bottom cover further includes a ground protrusion that is protruded from a side of a bottom surface of the seating space toward the liquid crystal panel so as to contact the main PCB.

7. The liquid crystal display of claim 6, wherein
    the ground protrusion includes a convex part bent toward the main PCB and a straight line part extended in both sides and elastically pressurizes the main PCB in the seating space.

8. The liquid crystal display of claim 1, wherein
    the panel guide further includes guiding grooves that guide insertion of the main PCB in the seating space.

* * * * *